No. 790,388. PATENTED MAY 23, 1905.
A. PETERSON.
MACHINE FOR MOLDING ARTIFICIAL STONE BLOCKS.
APPLICATION FILED JUNE 13, 1904.
3 SHEETS—SHEET 1.
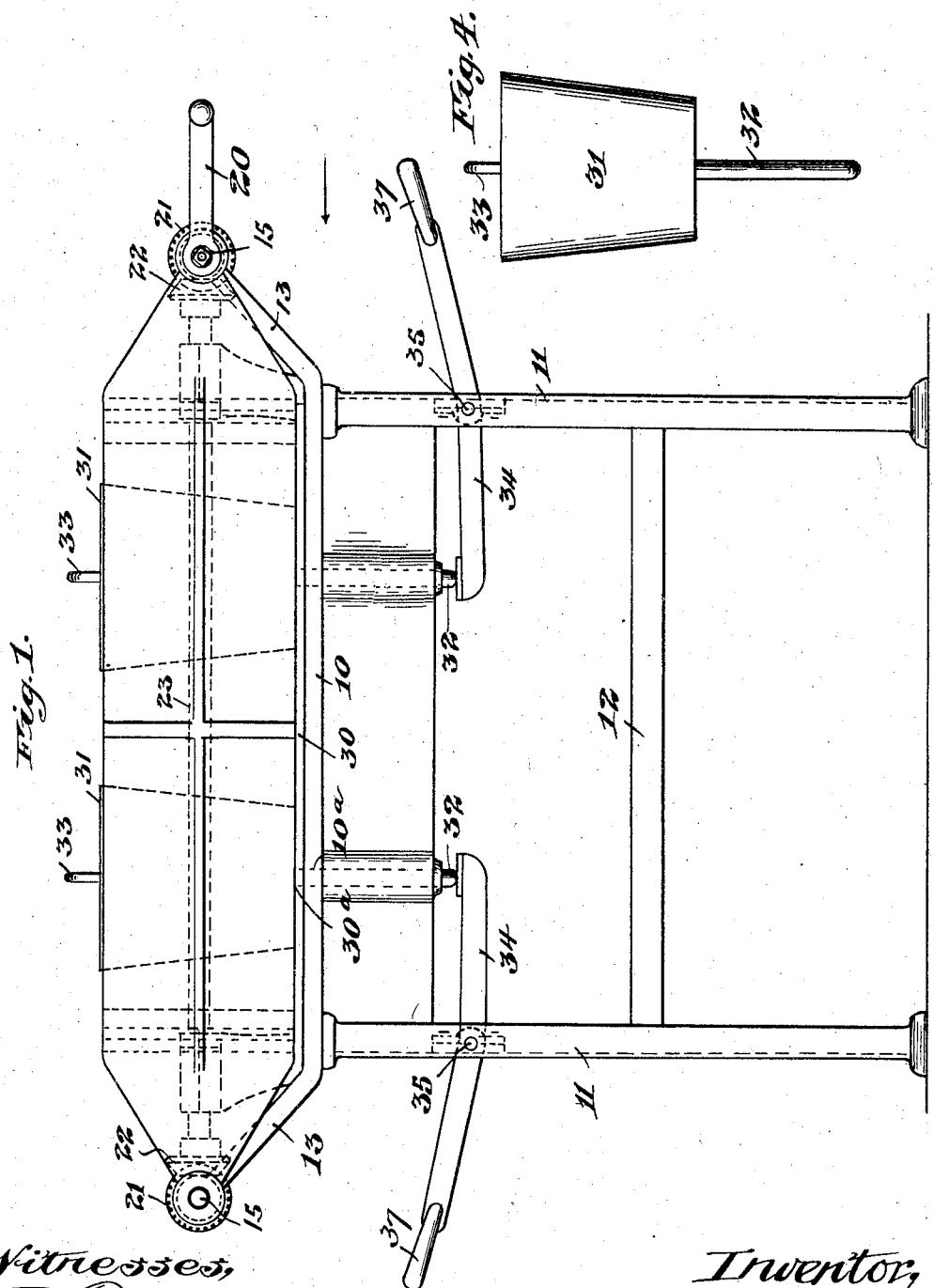

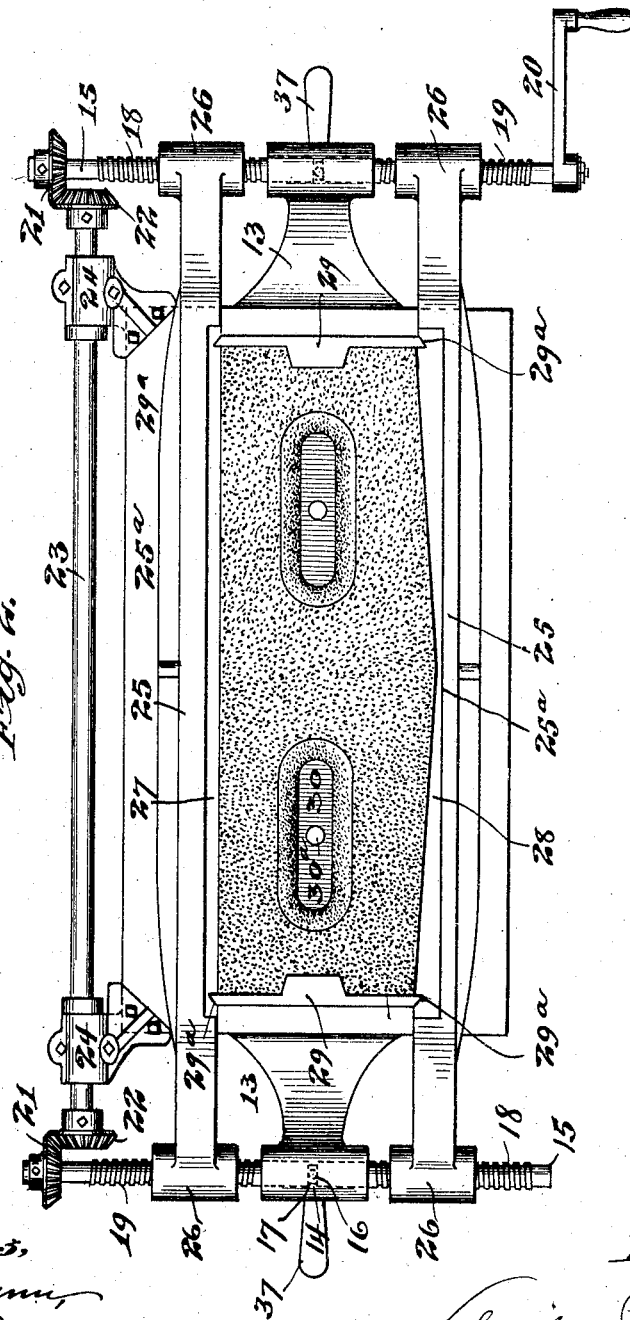

No. 790,388. PATENTED MAY 23, 1905.
A. PETERSON.
MACHINE FOR MOLDING ARTIFICIAL STONE BLOCKS.
APPLICATION FILED JUNE 13, 1904.
3 SHEETS—SHEET 3.
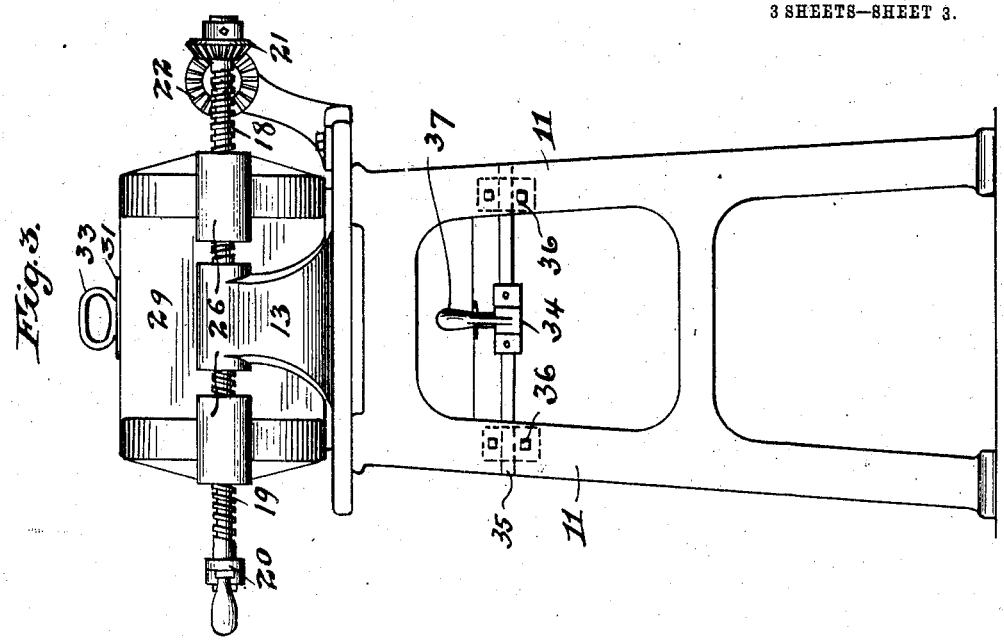
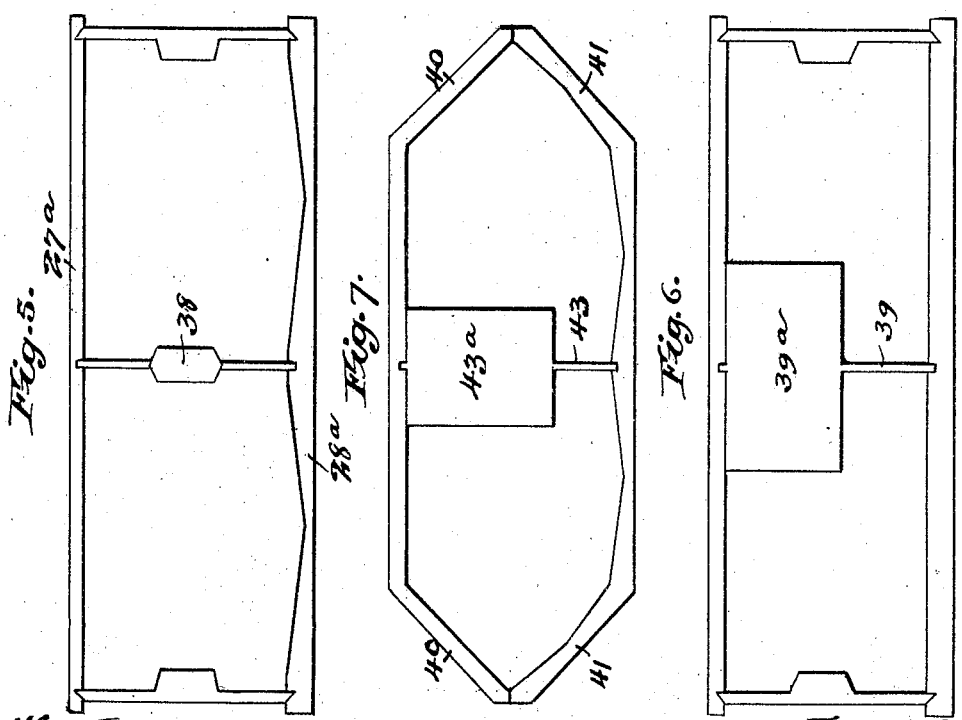
Witnesses,
Inventor,
Andrew Peterson
By Offield, Towle & Linthicum
Attys.

No. 790,388. Patented May 23, 1905.

UNITED STATES PATENT OFFICE.

ANDREW PETERSON, OF CHICAGO, ILLINOIS.

MACHINE FOR MOLDING ARTIFICIAL-STONE BLOCKS.

SPECIFICATION forming part of Letters Patent No. 790,388, dated May 23, 1905.

Application filed June 13, 1904. Serial No. 212,345.

*To all whom it may concern:*

Be it known that I, ANDREW PETERSON, a citizen of the United States, residing at Chicago, in the county of Cook and State of Illinois, have invented certain new and useful Improvements in Molds for Making Artificial-Stone Blocks, of which the following is a specification.

My invention relates to molds such as are adapted for the manufacture of artificial building and other blocks from plastic materials; and the invention has for its principal object to provide an improved mold of this character combining a high degree of rigidity and strength with facility and rapidity of manipulation and accuracy of form.

Another object of the invention is to provide a construction facilitating the employment of core-blocks where the latter are used for the purpose of lessening the weight and economizing the material of the product.

To these and other minor ends my invention consists in a new and improved mold of that type employing removable interlocking side and end walls chiefly characterized by the provision of novel means for assembling and separating the confining-walls of the mold by a single operation and novel means for facilitating the accurate positioning of the core-blocks and their subsequent withdrawal from the finished stone.

My invention in the best mechanical embodiment thereof which I have as yet devised is illustrated in the accompanying drawings, wherein—

Figure 1 is a side elevational view of the complete apparatus. Fig. 2 is a top plan view of the same, showing the core-blocks removed from the finished stone. Fig. 3 is an end elevational view. Fig. 4 is a side elevational detail view of one of the core-blocks removed; and Figs. 5, 6, and 7 are top plan views of mold-boxes employing confining-walls of varying contour for the manufacture of different styles of blocks and each having a central partition whereby each mold-box is capable of producing simultaneously a pair of duplicate blocks.

Referring to the drawings, 10 designates a flat horizontal table which is mounted on the upper ends of a pair of vertical end frames 11, suitably spaced and braced by an intermediate strut 12. On the ends of the table 10 are upwardly-inclined brackets 13, carrying on their upper and outer ends journal-bearings 14 for transverse end shafts 15, which latter are keyed against longitudinal movement in their bearings by pins 16 engaging circumferential grooves 17 in the shaft within the bearing. The opposite end portions of the shafts outside of the bearings are provided with right and left screw-threads 18 and 19, respectively, and on one end of one of the shafts 15 is keyed an operating crank-arm 20. The opposite ends of the two shafts carry bevel-pinions 21, which mesh with companion bevel-pinions 22 on the opposite ends of a connecting-shaft 23, journaled in brackets 24, secured to the corners of the table 10, from which it will be observed that the rotation of the shaft carrying the handle 20 will impart a simultaneous and equal rotation in the opposite direction to the other shaft.

25 designates each of a pair of parallel horizontal compressing-frames for the mold-box disposed laterally and extending longitudinally of the latter, the ends of which are provided with threaded sleeves 26, which engage the threaded portions of the shafts 15. The inner opposed faces of the frames 25 are countersunk or recessed, as shown at 25$^a$, to form seats for plates 27 and 28, forming the longitudinal side walls of the mold-box. These plates may be identical in construction; but I have herein illustrated one of the plates, 28, as slightly concaved on its inner face to form a block having a projecting or swelled front.

29 designates a pair of plates that form the end walls of the mold-box, these latter having their opposite vertical edges 29$^a$ beveled and adapted to engage correspondingly-shaped cross-grooves in the inner faces of the side walls 27 and 28 to insure a true rectangular assembling of the walls of the box and also to interlock said walls securely when the mold-box is charged. The bottom wall of the mold-box is constituted by a plain rectangular plate 30, which rests directly upon the table 10, its marginal portions extending beneath the lower edges of the side and end wall plates.

It is customary in the manufacture of artificial-stone blocks of this character to core them more or less, which effects a reduction in weight, an economy of material, and dead air-spaces without sacrificing the strength of the block. For this purpose I preferably employ in connection with my improved mold-box one or more core-blocks, which, as shown in Fig. 4, consists of a body 31 in the form of a flattened frustum of a cone, having a central depending stem 32, which passes through registering holes 30ª and 10ª in the plate 30 and table 10, respectively, and provided on its upper surface with hooks or staples 33 in the nature of handles. As a means for initially starting the core-blocks out of the molded block and elevating them to a position in which they can conveniently be removed by the handles 33 I provide levers 34, mounted on shafts 35, pivoted between the legs of the supporting-frame at each end of the machine in suitable brackets 36, secured to said legs, said levers at their inner ends bearing upwardly against the bottoms of the stems 32 and at their outer ends having handles 37, by depressing which the stems and core-blocks are raised. The stems 32 not only serve in connection with the levers 34 to facilitate the extraction of the core-blocks, but they also serve as tenons for the latter, holding them securely on the bottom of the mold-box and insuring their correct positioning thereon.

Fig. 2 represents the mold in a condition in which it has been charged with plastic material tamped or otherwise pressed therein, then allowed to set and dry, and the core-blocks removed preliminary to the removal of the finished stone. By turning the crank-arm 20 in a contra-clockwise direction the side frames 25, carrying the side plates 27 and 28 of the mold-box, will be simultaneously withdrawn, leaving the end walls 29 free to be removed by hand. The finished block may then be removed by a suitable hoisting-grapple or otherwise, after which the mold is again assembled by setting up the end walls and then bringing the side walls into interlocking engagement therewith by turning the crank-arm 20 in a clockwise direction, thus drawing the side frames 25 together. The core-blocks 21 are then inserted by passing their stems 32 through the holes 30ª and 10ª, whereupon the plastic material is charged into the mold, tamped therein, and left to dry and harden. When this last operation is complete, the core-blocks are removed by actuating the levers 34 to start the core-blocks free from the set material, after which the core-blocks may be readily lifted out by means of the handles 33, and the above-described operation is then repeated in connection with the manufacture of each successive artificial stone.

By varying the contour or formation of the inner surfaces of the wall-plates of the mold-box artificial blocks of varying forms and contours suitable to the different situations in which such building-blocks are used may be readily created. Where comparatively short blocks are required, the above-described mold-box may be divided into two or more portions by one or more transverse partitions, such as is indicated at 38 in Fig. 5, which partition is clamped endwise by and between the side walls 27ª and 28ª, entering transverse grooves in the inner faces of the latter to true the box and securely hold the partition.

Fig. 6 represents a mold-box having plain flat side and end walls with a central transverse partition 39, in which is included a rectangular enlargement 39ª, designed to create in the adjacent ends of the blocks rectangular depressions adapted to fit around a vertical window-casing stud or other frame member of the building, avoiding the necessity of specially cutting the block to fit such a situation.

Fig. 7 represents the mold-box designed for the formation of octagonal or other polygonal blocks, such as are designed to be located on rounding corners. In this case I may omit the end walls entirely and turn the end portions 40 and 41 of the side walls inwardly across the corners, so as to produce a mold having an internal surface contour adapted to impart to the block or blocks molded therein the desired polygonal form and surface contour. The partition 43 of this box is also represented as having a rectangular enlargement 43ª to produce a rectangular depression in the ends of the finished blocks to adapt them to fit around a vertical beam or other frame member of the building, as in Fig. 6.

It will be understood that I have not attempted to show anything more than illustrative forms in which the mold-box may be made up by the interposition of cross-partitions and the shaping of the confining-walls to create the desired form and contour of finished blocks and that the partitions and walls may all be varied in surface outline and dimensions to suit the particular requirements of the blocks to be created. It will also be evident that the structural features of the apparatus as described and shown can be modified in unessential details without departing from the spirit of the invention.

I claim—

1. A mold for artificial blocks, comprising a table, a bottom plate for the mold-box, superposed thereon, side and end wall plates superposed on said bottom plate and having interlocked joints, clamping-frames recessed on their inner faces to seat and hold said side-wall plates, a pair of rotatable shafts mounted transversely of the ends of said table and having oppositely-threaded engagement with the ends of said clamping-frames, means for imparting rotative movement to one of said shafts, and driving connections adapted to impart an equal rotation in an opposite direction to the other of said shafts, substantially as described.

2. A mold for artificial blocks comprising a table, an apertured bottom plate for the mold-box superposed thereon, side and end wall plates superposed on said bottom plate and having interlocked joints, clamping-frames engaging said side plates, means for actuating said clamping-frames inwardly and outwardly of the mold-box, and a core-block adapted to rest on said bottom plate and having a depending stem engaging and passing through the aperture of said bottom plate, substantially as described.

3. A mold for artificial blocks comprising a table, an apertured bottom plate for the mold-box superposed thereon, side and end wall plates superposed on said bottom plate and having interlocked joints, clamping-frames engaging said side plates, means for actuating said clamping-frames inwardly and outwardly of the mold-box, a cone-shaped core-block adapted to rest at its lower end on said bottom plate and having a depending stem fitting and passing through the aperture of said bottom plate, and means secured to said table for applying an upward thrust on said stems to eject said core-block, substantially as described.

4. A mold for artificial blocks comprising a table, an apertured bottom plate for the mold-box superposed thereon, side and end wall plates superposed on said bottom plate and having interlocked joints, clamping-frames engaging said side plates, means for actuating said clamping-frames inwardly and outwardly of the mold-box, a cone-shaped core-block adapted to rest at its lower end on said bottom plate and having a lifting-handle on its upper end and a depending stem on its lower end fitting and passing through the aperture of said bottom plate, and a lever pivoted to said table and adapted to impart an upward thrust to said core-stem, substantially as described.

5. In a mold for artificial blocks, a mold-box comprising separable side-wall plates, having inwardly-extended oblique-meeting end portions, the latter constituting together the end walls of the box, and a transverse partition extending between said side-wall plates and provided with a laterally-enlarged portion adapted to create a special end formation on the molded block, substantially as described.

ANDREW PETERSON.

Witnesses:
SAMUEL N. POND,
JULIA M. BRISTOL.